Patented Apr. 10, 1928.

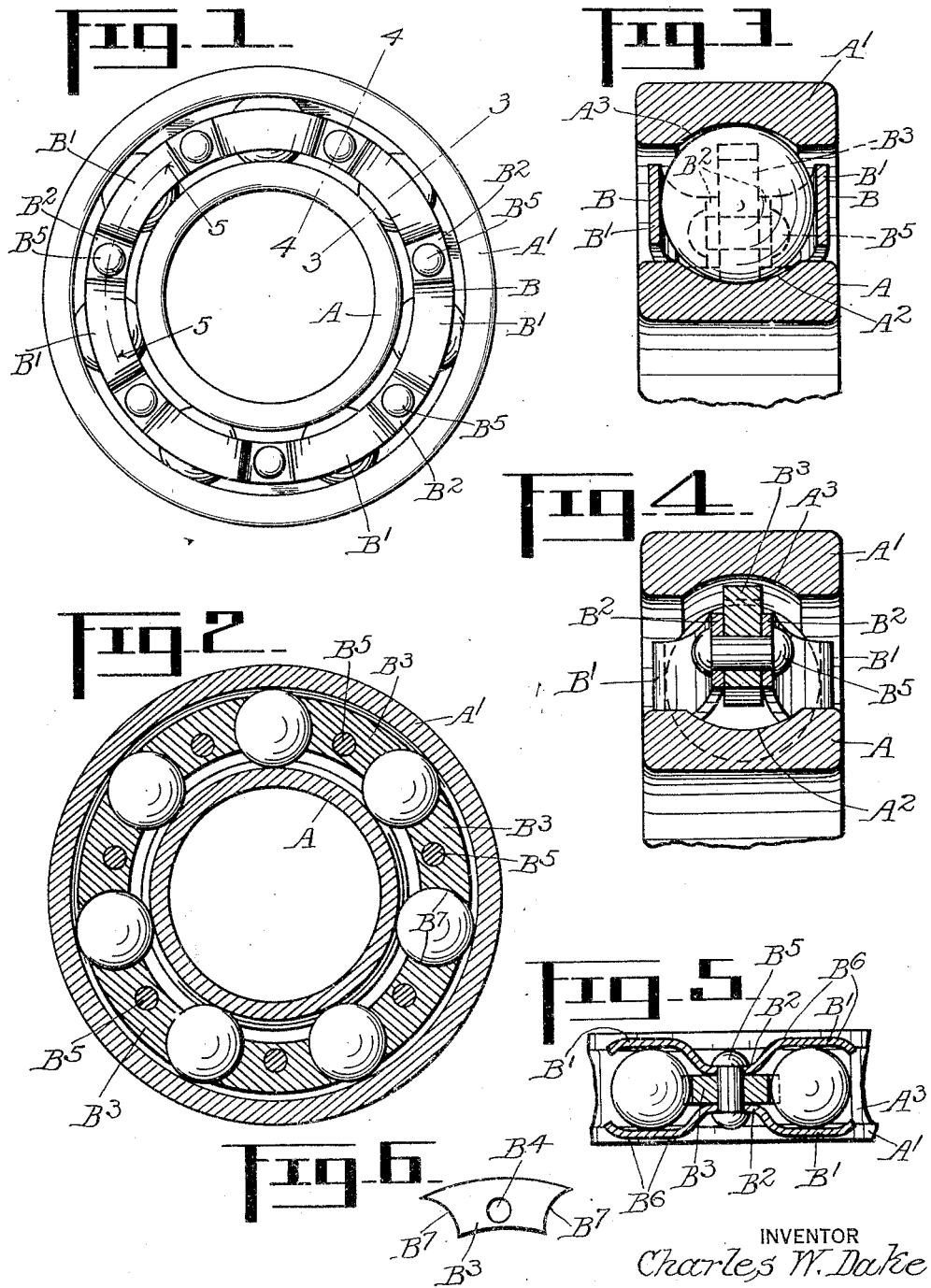

1,665,448

UNITED STATES PATENT OFFICE.

CHARLES W. DAKE, OF CHICAGO, ILLINOIS.

BALL BEARING.

Application filed April 5, 1926. Serial No. 99,779.

My invention relates to improvements in ball bearings and has for one object to provide a new and improved form of spacing or separating and retaining means whereby the balls may be spaced in the race and held in proper position.

In those ball bearings where the spacer or separator and retainer is integrally formed of two thin strips of metal held together between the balls, experience shows that breaking down of the bearing frequently takes place by destruction of the spacer and retainer. This is caused by the fact that whichever one of the balls is larger than the others tends to travel more rapidly, exerting a wedging action in the throat of the retainer, which wedging action builds up friction and gradually spreads or tears the retainer rings apart. It is to obviate this difficulty that my invention has been made. Other objects will appear from time to time throughout the specification and claims.

My invention is illustrated more or less diagrammatically in the accompanying drawings, wherein—

Figure 1 is a side view of the bearing;

Figure 2 is a section through the bearing in a plane perpendicular to the shaft showing the balls in elevation;

Figure 3 is a section on an enlarged scale along the line 3—3 of Figure 1;

Figure 4 is a section along the line 4—4 of Figure 1;

Figure 5 is a plan view of a part of the inner race showing balls in elevation with retainer and spacer or separator in section;

Figure 6 is a side elevation of the separator.

Like parts are indicated by like characters throughout the specification and drawings.

A is the inner race, $A^1$ the outer race. These races have circular grooves or tracks $A^2$, $A^3$ therein along which the balls are adapted to travel. The balls are assembled in the races by moving the inner race down to the bottom of the outer race giving clearance whereby the balls may be put in place. Then the races are moved into concentric position and the balls properly spaced around the periphery and held in place by means about to be described.

The retainer, there being one on each side, comprises an annular ring B having alternate outwardly bent sections $B^1$, inwardly bent sections $B^2$ intermediate the balls and between the two retainers are the separator segments $B^3$ apertured as at $B^4$ and adapted to be held between the retainers by the rivets $B^5$. Each rivet holds the two opposed inwardly bent retainer sections against the separator segment; the space between the outwardly bent retainer sections is substantially equal to the ball diameter and it will be noted that these outwardly bent sections have relatively elongated ball contacting surfaces $B^6$, the arrangement of the parts being such that there is only a point contact between the balls and the retainers. The separators form segments of an annular ring and have curved surfaces $B^7$ $B^7$ adapted to engage and to be substantially concentric with the balls. These separators are in line with the centers of the balls and project inwardly from the inclined walls of the retainers so that each ball is constricted between its opposed two separators and between the retainers, there being point contact with the retainers and line contact with the separators. Pressure on the separator is transmitted through the ring to the retainer but no wedging action can take place. Preferably the separators are made of bronze or other suitable anti-friction material which is adapted to engage the ball with a minimum of friction.

By this arrangement there is a minimum of contact between the balls and the retainer and separator elements. Thus friction is reduced to a minimum and lubrication is made easy and since there is no wedging action but a simple thrust action between the ball and the spacer and since the thrust action on any spacer may be transmitted by straight lines by it or through it to the next ball, danger of destruction of the spacer or retainer and the wedging apart of the parts or tearing apart of the ring is obviated.

By the arrangement shown with the curved abutting ends of the blocks engaging the balls, the block and ring assembly is always centered no matter which way rotation takes place and no matter what the degree of wear is because each ball always is forced forward into the curved faces on the block and thereby held in proper working relation.

I claim:

1. A ball bearing comprising inner and outer races, balls interposed between them, a plurality of separate curved segmental solid spacer blocks, one between each adjacent pair of balls, said blocks having curved end surfaces to engage and conform to the surface of the ball, retainer rings one on each side of the group of balls, the rings being laterally displaced to bring them into engagement with spacer blocks at points intermediate thereof, and being spread out to bring them into engagement with diametrically opposed points on the balls, the rings when spread being parallel throughout a portion of their length, the balls being free to move longitudinally between the retainer rings as far as the rings are concerned without changing the relation between the ball and the ring.

2. In a ball bearing, a pair of retainer rings adapted to lie one on each side of a group of balls, the rings being throughout the major portion of their periphery parallel with each other and providing parallel walled pockets for the balls, spacer blocks interposed between adjacent pairs of balls, the rings being inwardly bent at intervals to bring them into engagement with the blocks, means for holding the rings and blocks together whereby each ball is contacted only by the two spacer blocks on opposed sides and by the retainer ring at two diametrically opposed points.

3. A ball bearing comprising inner and outer races, balls adapted to travel between them, spacer blocks between adjacent balls, the width of which is materially less than the diameter of the balls, holding rings located on either side of the group of balls and blocks, the rings being inwardly bent at intervals to engage the blocks, and parallel with each other where they approach and are subject to engagement with the balls.

4. A ball bearing comprising inner and outer races, balls adapted to travel between them, spacer blocks between adjacent balls, the width of which is materially less than the diameter of the balls, holding rings located on either side of the group of balls and blocks, the rings being inwardly bent at intervals to engage the blocks, the ball engaging faces of each block being curved to conform to the contour of the ball, the relation of the blocks and balls being such that an arc described about the center of the ball races and passing through the center of any two adjacent balls passes through the ball engaging faces on the block at a point appreciably nearer the inner than the outer boundary of the ball engaging face.

5. In a ball bearing, a pair of retainer rings adapted to lie one on each side of a group of balls, the rings being throughout the major portion of their periphery parallel with each other and providing parallel walled pockets for the balls, spacer blocks interposed between adjacent pairs of balls, the rings being inwardly bent at intervals to bring them into engagement with the blocks, means for holding the rings and blocks together whereby each ball is contacted only by the two spacer blocks on opposed sides and by the retainer ring at two diametrically opposed points, the spacer blocks where they are interposed between adjacent pairs of balls being adapted to position the cage with respect to the balls.

6. In a ball bearing comprising inner and outer races having curved ball engaging surfaces, balls adapted to travel therein, a spacer cage associated with said balls and spacer blocks interposed between the balls, the outer peripheries of the spacer blocks penetrating within the curved portion of the outer race, the inner peripheries of the spacer blocks being located entirely out of the curved portion of the inner race.

Signed at Chicago, county of Cook and State of Illinois, this 25th day of March, 1926.

CHARLES W. DAKE.